US008214988B2

(12) United States Patent
Lee et al.

(10) Patent No.: US 8,214,988 B2
(45) Date of Patent: Jul. 10, 2012

(54) BEARING HANDLING TOOL

(75) Inventors: Siang-Ting Lee, Taichung (TW); Jian-Fu Lin, Taichung (TW)

(73) Assignee: Jyi Fu Tay Co., Ltd., Taichung (TW)

( * ) Notice: Subject to any disclaimer, the term of this patent is extended or adjusted under 35 U.S.C. 154(b) by 239 days.

(21) Appl. No.: 12/780,212

(22) Filed: May 14, 2010

(65) Prior Publication Data

US 2011/0277289 A1 Nov. 17, 2011

(51) Int. Cl.
*B23P 19/04* (2006.01)

(52) U.S. Cl. ................. 29/266; 29/270; 29/278; 29/255

(58) Field of Classification Search .................... 29/266, 29/255, 252, 270, 278, 244

See application file for complete search history.

(56) References Cited

U.S. PATENT DOCUMENTS

| | | | | |
|---|---|---|---|---|
| 2,050,005 | A * | 8/1936 | Heegeman | 29/263 |
| 4,967,468 | A * | 11/1990 | Vossbrinck et al. | 29/726 |
| 5,090,102 | A * | 2/1992 | Lovell | 29/255 |
| 5,784,783 | A * | 7/1998 | Carpenter | 29/888.011 |
| 6,266,859 | B1 * | 7/2001 | Hernandez | 29/256 |
| 6,637,089 | B1 * | 10/2003 | English | 29/264 |
| 6,990,713 | B2 * | 1/2006 | Tally et al. | 29/264 |
| 7,658,368 | B2 * | 2/2010 | Laun | 254/18 |
| 7,832,071 | B2 * | 11/2010 | Klann | 29/214 |
| 7,987,571 | B2 * | 8/2011 | English | 29/264 |
| 8,069,544 | B2 * | 12/2011 | Sollami | 29/254 |
| 2008/0235930 | A1 * | 10/2008 | English | 29/426.5 |

* cited by examiner

*Primary Examiner* — Lee D Wilson
(74) *Attorney, Agent, or Firm* — Rosenberg, Klein & Lee

(57) ABSTRACT

A bearing handling tool is revealed. The bearing handling tool includes a tool body having a fixing member arranged at a middle part thereof. The fixing member is for fixing the tool body to a machine such as engines or transmissions of car models, ship models, airplane models, etc. The tool body further has a connection end on one end and a plurality of locking parts on the other end thereof. The connection end is to handle the bearing near a surface of the machine while the locking part is for handling the bearing in the machine. The handling tool is used depending on the condition and providing convenient assembling and disassembling. Moreover, the attaching and detaching of the bearing have no influence on the machine and with high industrial application value.

13 Claims, 7 Drawing Sheets

BEARING HANDLING TOOL

BACKGROUND OF THE INVENTION

1. Fields of the Invention

The present invention relates to a bearing handling tool, especially to a bearing handling tool for assembling and disassembling bearings of a machine such as engines or transmissions of cars models, boat models, airplane models, etc.

2. Descriptions of Related Art

Generally, machines such as engines or transmissions of car models, boat models, or airplane models are made from metal and a plurality of bearings are installed in the machines for pivotally connecting the components therein.

When users need to replace the bearings, the machine is heated and expanded in advance and the bearing is detached from a machine by striking. The bears are installed in a similar way. However, the heat and the striking may cause deformation even damage of the machine and this results in great loss to operators.

Thus there is a need to invent a bearing handling tool for convenient assembling and disassembling of bearings.

SUMMARY OF THE INVENTION

Therefore it is a primary object of the present invention to provide a bearing handling tool that includes a connection end and a locking part. The connection end is used to assemble and disassemble at least one bearing near a surface of a machine while the locking part is for attaching and detaching at least one bearing in the machine. Thus the bearing handling tool is used according to the condition of the bearing arranged at the machine and is allowing convenient assembling and disassembling. Moreover, the attaching and detaching of the bearing have no influence such as deformation on the machine. The device has high industrial application value.

In order to achieve object, a bearing handling tool according to the present invention includes a tool body 1 for conveniently assembling and disassembling bearings of a machine such as engines or transmissions of cars models, boat models, airplane models, etc. A fixing member for fixing the tool body to the machine is arranged at a middle part of the tool body. An axial driving part is wrapped around an outer wall of the tool body and around an inner wall of the fixing member respectively, corresponding and connected to each other. Thus the tool body is guided for axial motion on the fixing member. Moreover, a connection end for connected to the bearing is disposed on one end of the tool body and a release stopper for putting the bearing out is set between the connection end and the tool body. As to the connection end, it is arranged with a clamping member for holding and fixing the bearing and providing convenient assembling. Furthermore, a plurality of locking parts is set on the other end of the tool body and an adjustment member is arranged at the inner side of the locking part. An adjustment part formed on the locking part and an adjustment part formed on the adjustment member are corresponding to each other to extend each locking part. Thus the locking part is locked and connected with the bearing. An against-stopper and a corresponding securing part are formed on an outer wall of the locking part for holding and fixing the bearing 21 so as to provide easy assembling.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
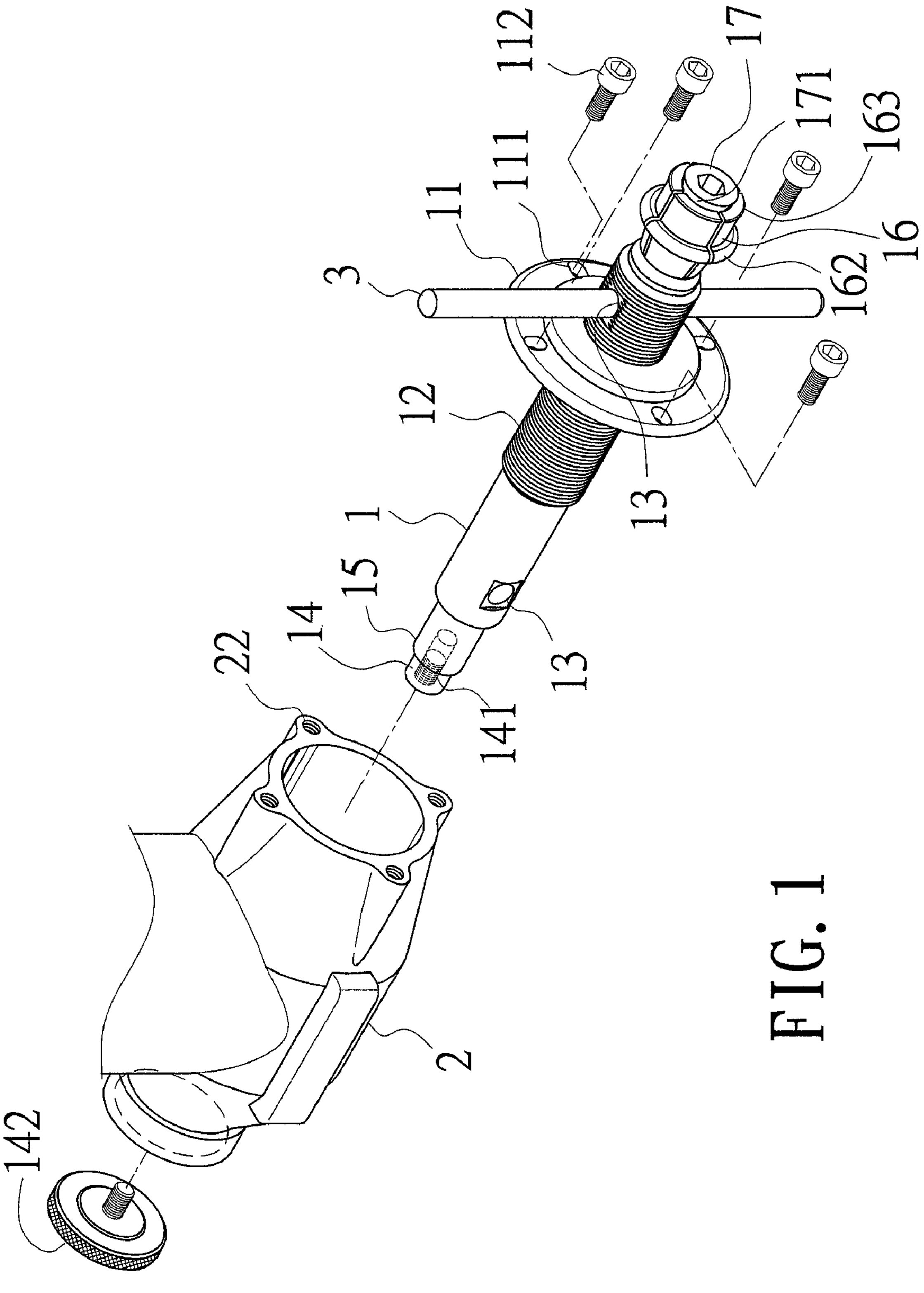
FIG. 1 is a perspective view of an embodiment according to the present invention.
Figure 2:
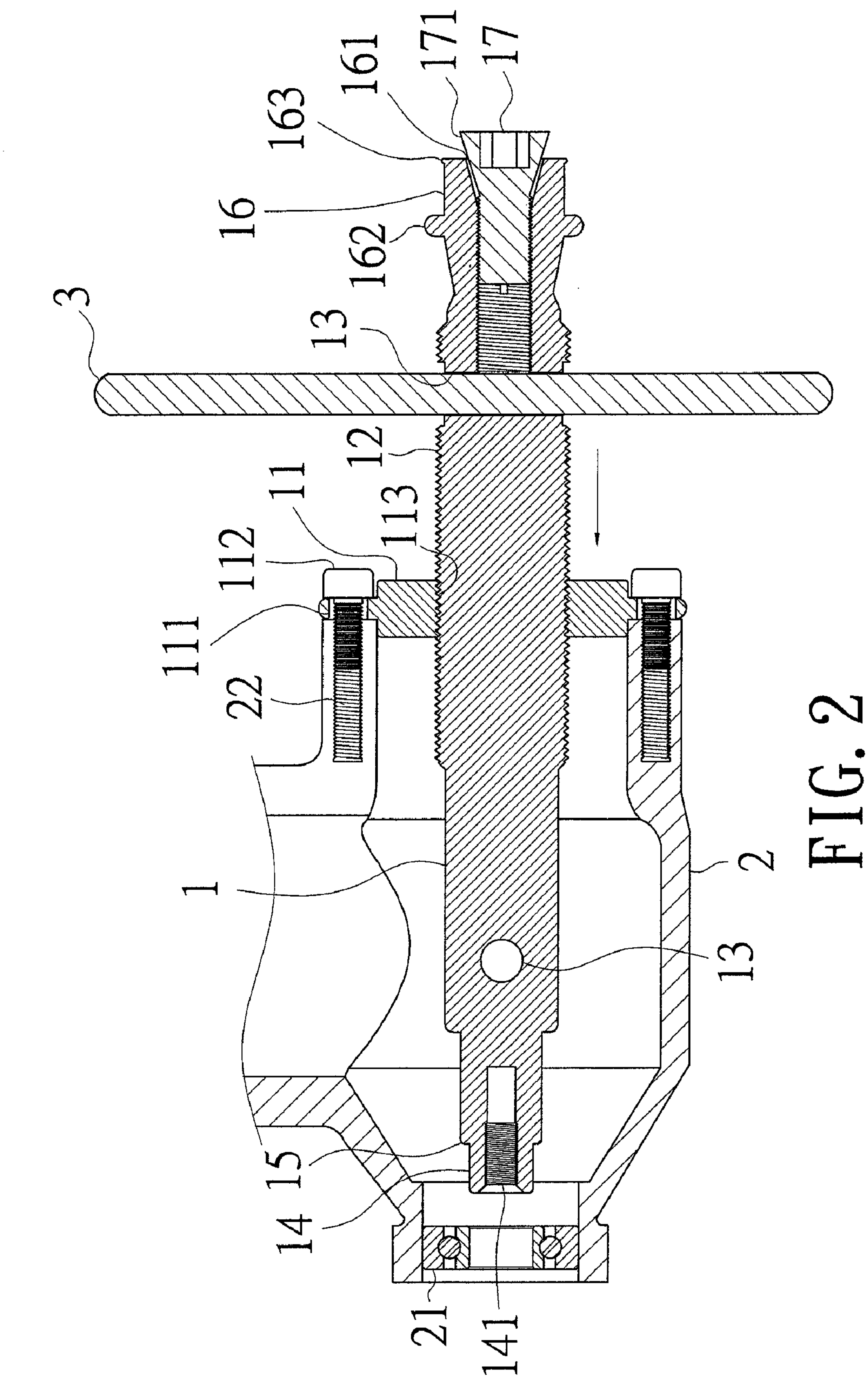
FIG. 2 is a schematic drawing showing a connected state of an embodiment in use.

Refer to FIG. 1 and FIG. 2, a bearing handling tool of the present invention includes a tool body 1 for attaching and detaching at least one bearing 21 mounted in a machine (2) such as engines or transmissions of car models, boat models, airplane models, etc conveniently. A fixing member 11 is disposed on a middle part of the tool body 1 so as to fix the tool body 1 to the machine 2. A plurality of insertion holes 111 is arranged around a circumference of the fixing member 11 and a screw is passed through each insertion hole 111 and is fit into a screw hole 22 on the machine 2 so as to fix the tool body 1 onto the machine 2. An axial driving part 12 and an axial driving part 113 such as a plurality of threads is respectively wrapped around an outer wall of the tool body 1 and an inner wall of the fixing member 11, corresponding to each other. Thus the tool body 1 is guided for axial motion on the fixing member 11. Moreover, a hand-tool connection part 13 for being penetrated by a hand tool 3 such as round bar is arranged at a side wall on each of two sides of the tool body 1 so as to rotate the tool body 1. Furthermore, a connection end 14 for connected to the bearing 21 is disposed on one end of the tool body 1 and a release stopper 15 for pushing the bearing 21 out the bearing is set between the connection end 14 and the tool body 1. The connection end 14 is further arranged with a screw hole 141 that is threaded with a clamping member 142 for holding and fixing the bearing 21 and providing convenient assembling. In addition, a, plurality of locking parts 16 such as a locking plate is disposed on the other end of the tool body 1 and an adjustment member 17 such as a screw is set on an inner side of the locking part 16. The locking part 16 and the adjustment member 17 respectively include an adjustment part 161, 171, such as a tapered part. and the tapered angle of the adjustment part 171 of the adjustment part 171 is larger than that of the adjustment part 161 of the locking part 16. Thus each locking part 16 is extended to be locked and connected with the bearing 21. An against-stopper 162 and a corresponding securing part 163 are formed on an outer wall of the locking part 16 for holding and fixing the bearing 21 so as to provide easy assembling.

Figure 3:
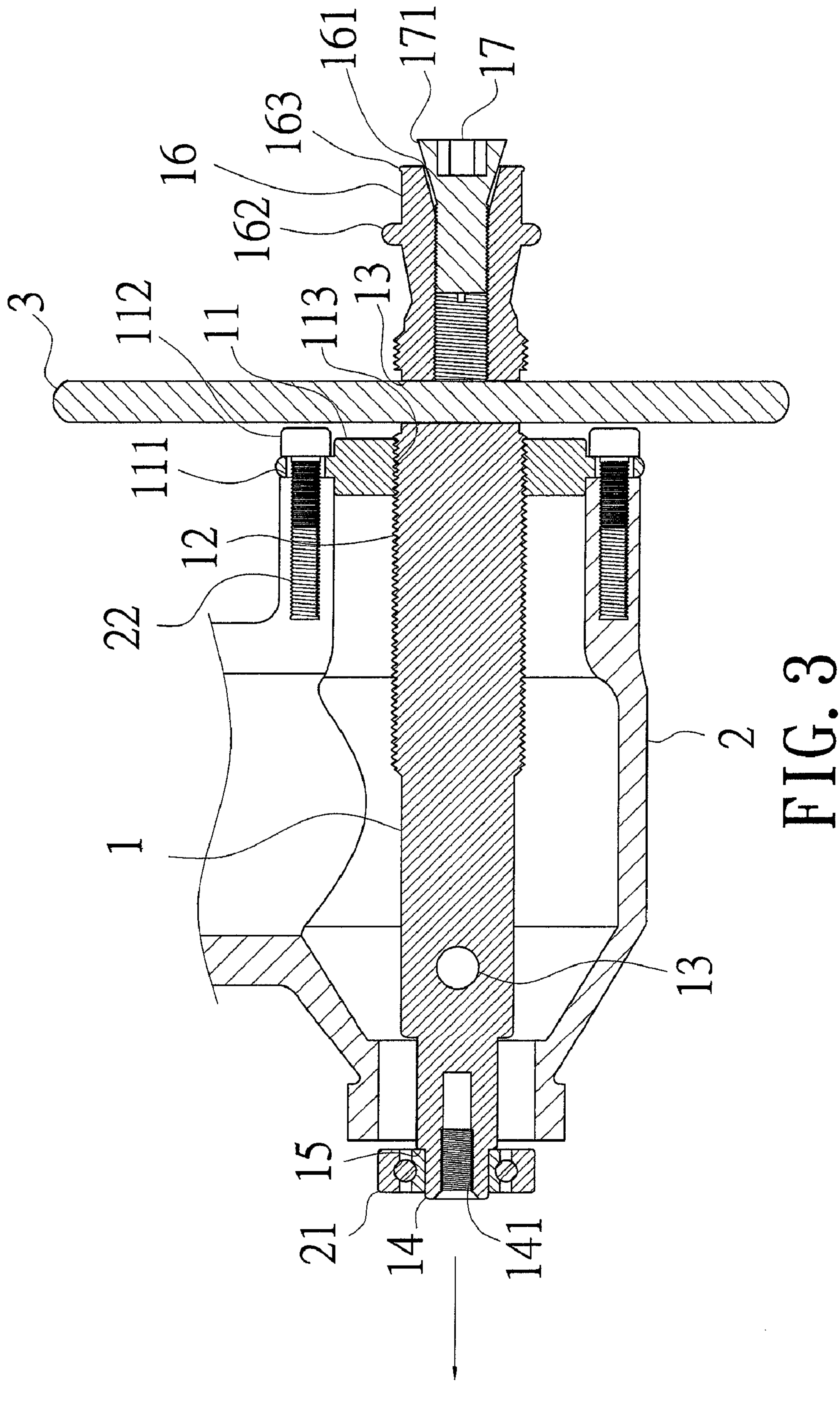
FIG. 3 is a schematic drawing showing a releasing state of an embodiment in use.
Figure 4:
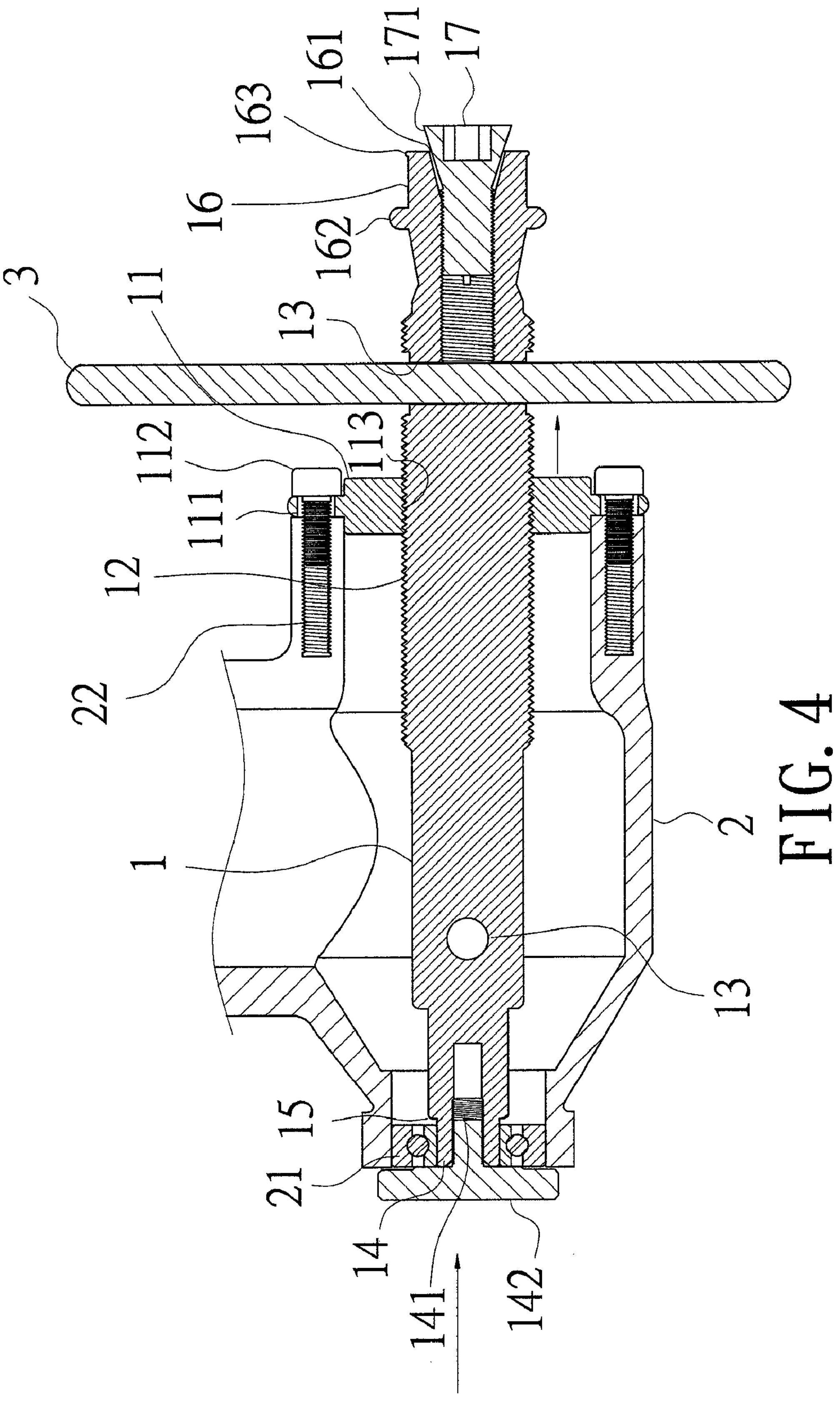
FIG. 4 is a schematic drawing showing an assembled state of another embodiment in use.

In use, refer to FIG. 1 and FIG. 2, an embodiment of the present invention is to attach and detach at least one bearing 21 near the surface of the machine 2. At first, the connection end 14 of the tool body 1 is inserted into an inner space of the machine 2 and each insertion hole 111 around the circumference of the fixing member 11 is aligned with each screw hole 22 on the machine 2. Then each screw 112 is threaded into each screw hole 22 respectively so as to fix the tool body 1 on the machine 2. Next, the hand tool 3 is passed through the hand-tool connection part 13 to rotate the tool body 1 so that the tool body 1 moves toward the machine 2 gradually by the axial driving parts 12, 113. Until the connection end 14 contact with the bearing 21, continue rotate the tool body 1 by the hand tool 3 so as to make the release stopper 15 push the bearing 21 out, as shown in FIG. 3. While replacing a new bearing 21, refer to FIG. 4, the new bearing 21 is mounted in the connection end 14 of the tool body 1 and the clamping member 142 is threaded into the screw hole 141. Thus the bearing 21 is clipped between the connection end 14 and the clamping member 142. Rotate the tool body 1 in reverse direction by the hand tool 3 so as to pull the bearing 21 gradually into the machine 2 and finally the bearing 21 is fixed in the machine 2. Therefore, the bearing 21 is assembled and disassembled conveniently and the assembling/disassembling procedures have no negative effects such as deformation on the machine 2.

Figure 5:
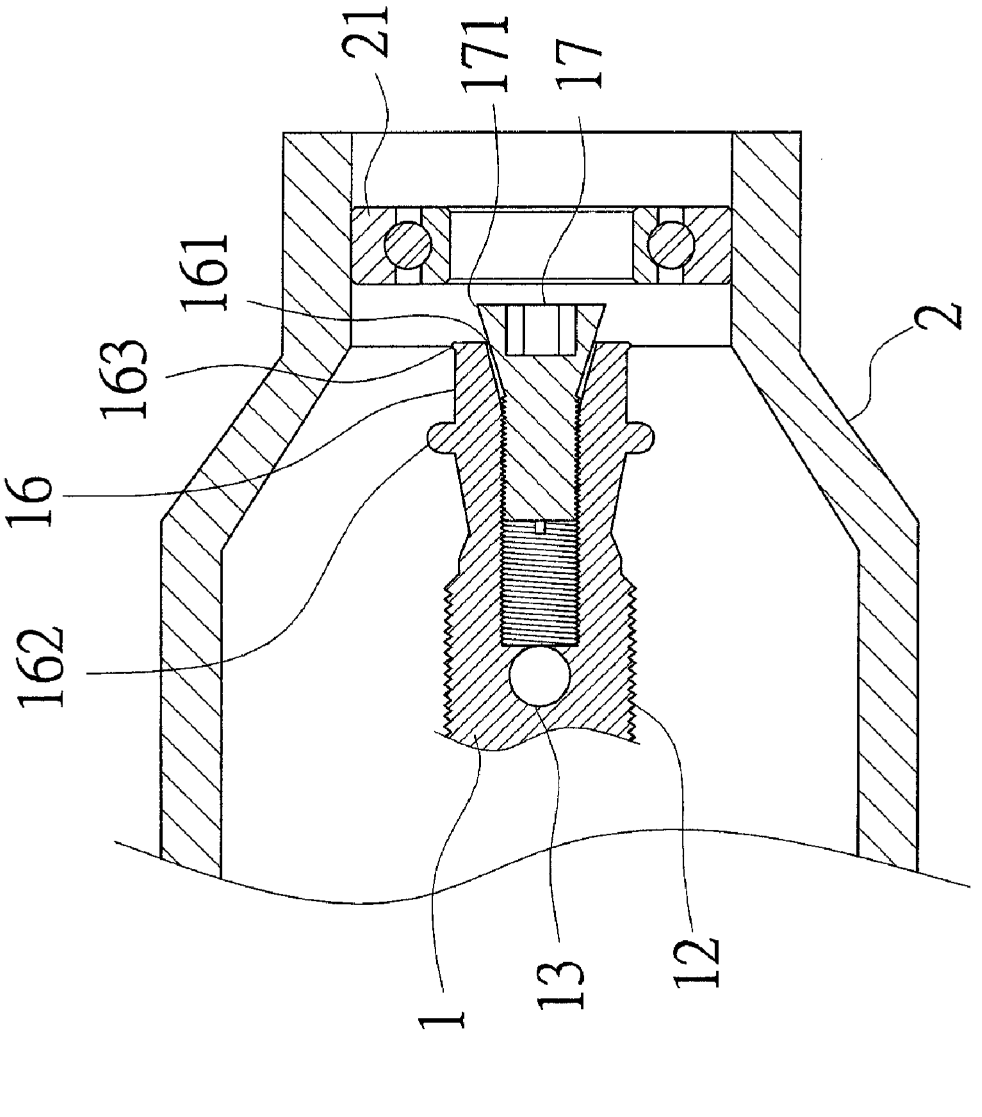
FIG. 5 is a schematic drawing showing a connected state of another embodiment in use.
Figure 6:
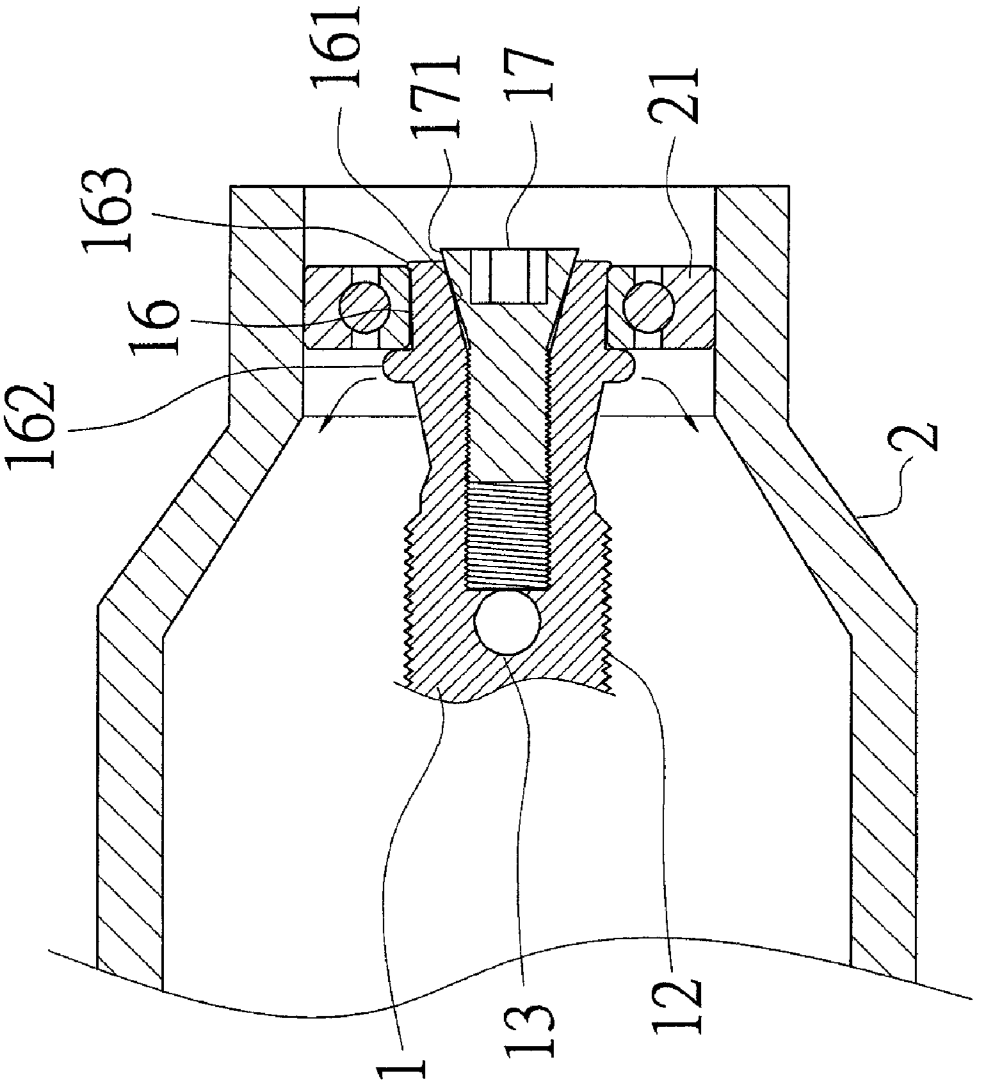
FIG. 6 is a schematic drawing showing a locking state of another embodiment in use.
Figure 7:
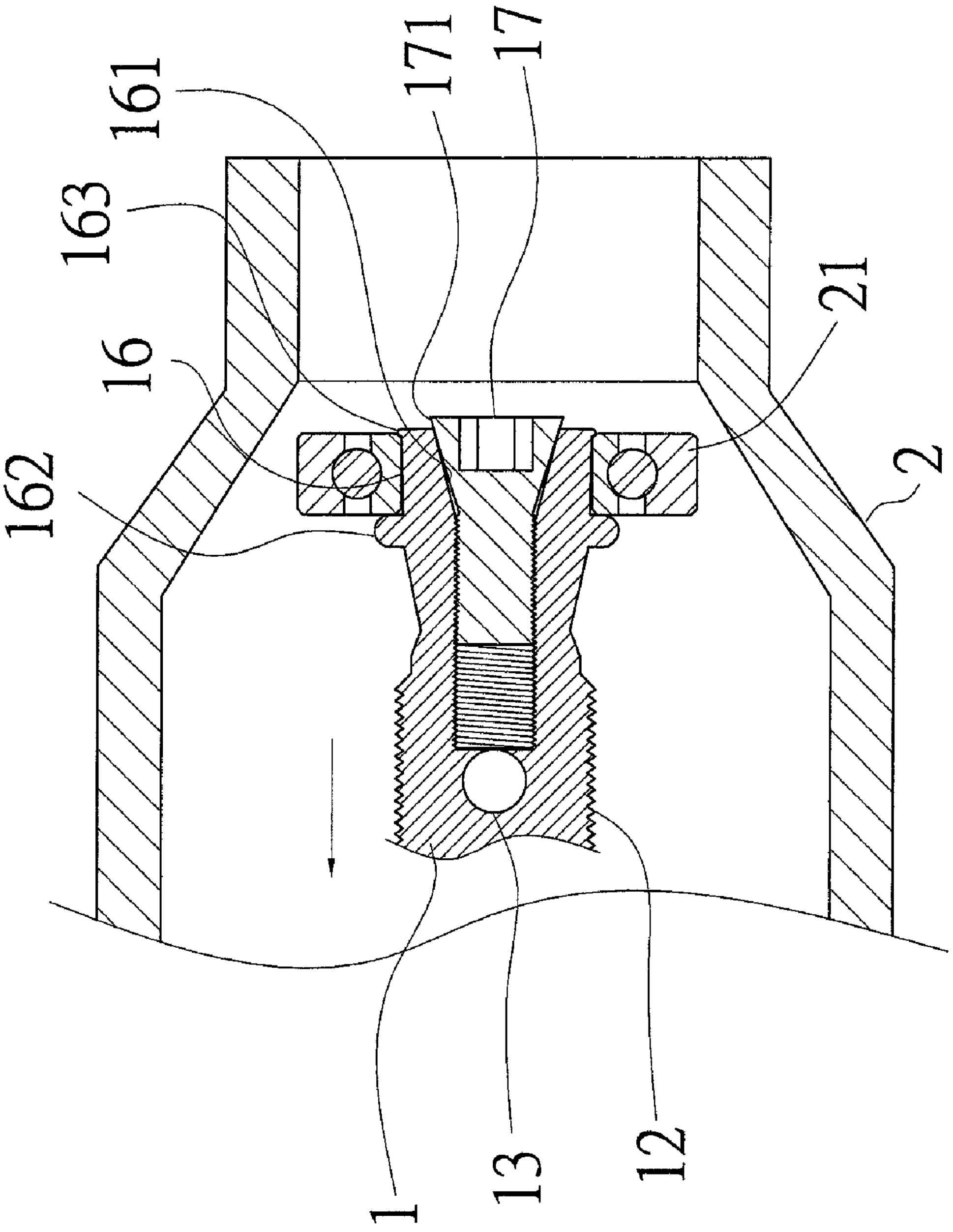
FIG. 7 is a schematic drawing showing a disassembling state of another embodiment in use.

Refer from FIG. 1 and FIG. 5, while disassembling the bearing 21 in the machine 2, firstly the adjustment member 17 of the tool body 1 is released from the locking part 16 and one end of the tool body 1 with the locking part 16 is put into the inner space of the machine 2 and the tool body 1 is fixed to the machine 2 by the fixing member 11. Use the hand tool 3 to rotate the tool body 1 so as to make the tool body 1 move toward the machine 2 until the locking part 16 in mounted into the bearing 21. Refer to FIG. 6, each adjustment member 17 is fastened onto the inner side of each locking part 16 so that the adjustment part 171 of the adjustment member 17 presses the adjustment member 161 of the locking part 16. Thus each locking part 16 is extended outward to be locked and connected with the bearing 21. At the same time, the against-stopper 162, and the securing part 163 on an outer wall of the locking part 16 clamp the two sides of the bearing 21. Refer to FIG. 7, keep using the hand tool 3 to rotate the tool body 1 and the bearing 21 is going to be pulled out by each locking part 16. For replacement of a new bearing 21, the procedures are taken in a reverse manner.

Compared with the structure available now, the present invention has following advantages:

1. The tool body of the present invention is disposed with a fixing member for fixing the tool body to the machine such as engines or transmissions of car models, ship models, airplane models, etc. The two ends of the tool body are disposed with the connection end and a plurality of locking parts respectively for connecting with at least one bearing arranged on the machine. The design allows easy attaching and detaching of the bearing set on the machine. Moreover, the attaching and detaching of the bearing have no negative effects, such as deformation, on the machine.
2. The tool body of the present invention assembles and disassembles at least one bearing near the surface of the machine by means of the connection end while the locking part is used to attach and detach at least one bearing in the machine. The end of the tool body used depends on the condition and has high industrial application value.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A bearing handling tool comprising:
- a tool body disposed with a fixing member while the tool body and the fixing member respectively having an axial driving part; the axial driving part of the tool body and the axial driving part of the fixing member corresponding to each other;
- a connection end arranged at one end of the tool body and having a clamping member;
- a release stopper set between the connection end and the tool body;
- at least one locking part disposed on the other end of the tool body and having an adjustment part; an against-stopper and a corresponding securing part set on an outer wall of the locking part, and
- an adjustment member disposed on the other end of the tool body and having an adjustment part while the adjustment part of the locking part and the adjustment part of the adjustment member corresponding to each other.

2. The device as claimed in claim 1, wherein the adjustment part of the locking part and the adjustment part of the adjustment member are tapered parts, corresponding to each other.

3. The device as claimed in claim 2, wherein tapered angle of the adjustment member is larger than tapered angle of the locking part.

4. The device as claimed in claim 3, wherein the locking part is a locking plate.

5. The device as claimed in claim 3, wherein the adjustment member is a screw.

6. The device as claimed in claim 2, wherein the locking part is a locking plate.

7. The device as claimed in claim 2, wherein the adjustment member is a screw.

8. The device as claimed in claim 1, wherein the fixing member is disposed with at least one insertion hole and at least one screw is passed through the insertion hole.

9. The device as claimed in claim 1, wherein the axial driving part of the tool body and the axial driving part of the fixing member are threads, corresponding to each other.

10. The device as claimed in claim 9, wherein the tool body is arranged with a hand-tool connection part.

11. The device as claimed in claim 1, wherein the tool body is arranged with a hand-tool connection part.

12. The device as claimed in claim 1, wherein the locking part is a locking plate.

13. The device as claimed in claim 1, wherein the adjustment member is a screw.

* * * * *